United States Patent
Norp et al.

(10) Patent No.: US 9,137,625 B2
(45) Date of Patent: *Sep. 15, 2015

(54) TELECOMMUNICATIONS NETWORK RESPONSIVE TO SERVER-PROVIDED LOCATION INFORMATION

(71) Applicants: Koninklijke KPN N.V., The Hague (NL); Nederlandse Organisatie voor Toegepast-Natuurwetenschappelijk Onderzoek TNO, Delft (NL)

(72) Inventors: Antonius Hendrikus Johannes Norp, The Hague (NL); Annemieke Kips Josefa Rene Kips, Leiden (NL); Michael Robert Schenk, The Hague (NL)

(73) Assignee: Koninklijke KPN N.V., The Hague (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/055,998

(22) Filed: Oct. 17, 2013

(65) Prior Publication Data

US 2014/0044049 A1    Feb. 13, 2014

Related U.S. Application Data

(63) Continuation of application No. 12/769,018, filed on Apr. 28, 2010, now Pat. No. 8,588,137.

(30) Foreign Application Priority Data

Apr. 28, 2009 (EP) .................................. 09005866

(51) Int. Cl.
*H04W 4/00* (2009.01)
*H04W 48/00* (2009.01)
(Continued)

(52) U.S. Cl.
CPC ................ *H04W 4/005* (2013.01); *H04W 4/02* (2013.01); *H04W 48/17* (2013.01); *H04W 8/08* (2013.01); *H04W 76/02* (2013.01)

(58) Field of Classification Search
CPC ................................................... H04W 4/005

USPC ........................................................ 370/328
See application file for complete search history.

(56) References Cited

U.S. PATENT DOCUMENTS 7,027,800 B2    4/2006    Haumont et al.
2003/0204627 A1    10/2003    Mizell et al.
(Continued)

FOREIGN PATENT DOCUMENTS

GB    2387297 A  *  10/2003
WO    WO2005/122617    12/2005
(Continued)

OTHER PUBLICATIONS

EP Search Report, European Patent Application No. 09005866.0, dated Nov. 13, 2009.
(Continued)

*Primary Examiner* — Maharishi Khirodhar
(74) *Attorney, Agent, or Firm* — McDonnell Boehnen Hulbert & Berghoff LLP

(57) ABSTRACT

The invention relates to a telecommunications network for wirelessly establishing a connection with a terminal located at a location in said network by a server. The terminal is identified by a terminal identifier in the telecommunications network. The telecommunications network contains a first network node and a second network node. The first network node is configured for receiving a data unit for the terminal from the server, that is preferably located outside the telecommunications network. The data unit comprises the terminal identifier. The first network node is being configured for receiving a location identifier indicative of the location of the terminal from the server and for deriving an address of the second network node using the location identifier. The derived address of the second network node is then used for transmitting a first connection request for establishing a connection with the derived second network node.

6 Claims, 3 Drawing Sheets

(51) Int. Cl.
*H04W 4/02* (2009.01)
*H04W 8/08* (2009.01)
*H04W 76/02* (2009.01)

(56) References Cited

U.S. PATENT DOCUMENTS

2005/0032529 A1* 2/2005 Akama ............... 455/456.2
2007/0135121 A1* 6/2007 Bae et al. ............ 455/432.1
2010/0041364 A1 2/2010 Lott et al.

FOREIGN PATENT DOCUMENTS

| WO | WO 2005122617 A1 * | 12/2005 |
| WO | WO2008/127155 | 10/2008 |
| WO | WO 2008127155 A1 * | 10/2008 |

OTHER PUBLICATIONS

"3rd Generation Partnership Project: Technical Specification Group Services and Systems Aspects: Network Architecture (Release 8)", 3GPP TS 23.002 V8.4.0, Dec. 2008, pp. 1-88.
"3rd Generation Partnership Project: Technical Specification Group Services and System Aspects: General Packet Radio Service (GPRS); Service Description; Stage 2 (Release 8)", 3GPP TS 23.060 V8.4.0, Mar. 2009, pp. 1-276.
"3rd Generation Partnership Project: Technical Specification Group Services and System Aspects; General Packet Radio Service (GPRS) Enhancements for Evolved Universal Terrestrial Radio Access Network (E-UTRAN) Access (Release 8)", 3GPP TS 23.401 V8.5.0, Mar. 2009, pp. 1-223.
"3rd Generation Partnership Project; Technical Specification Group Core Network and Terminals; General Packet Radio Service (GPRS); GPRS Tunnelling Protocol (GTP) Across the Gn and Gp Interface (Release 8)", 3GPP TS 29.060 V8.7.0, Mar. 2009, pp. 1-47.
"3rd Generation Partnership Project; Technical Specification Group Radio Access Network; UTRAN Iu Interface Radio Access Network Application Part (RANAP) Signalling (Release 8)", 3GPP TS 25.413 V8.2.1, Mar. 2009, pp. 1-394.
"3rd Generation Partnership Project: Technical Specification Group Core Network and Terminals; Basic Call Handling; Technical Realization (Release 8)", 3GPP TS 23.018 V8.1.1, Dec. 2008, pp. 1-282.
Office Action in U.S. Appl. No. 12/769,018 mailed Aug. 21, 2012.
Final Office Action in U.S. Appl. No. 12/769,018 mailed Feb. 28, 2013.
Notice of Allowance in U.S. Appl. No. 12/769,018 mailed Jul. 17, 2013.

* cited by examiner

TELECOMMUNICATIONS NETWORK RESPONSIVE TO SERVER-PROVIDED LOCATION INFORMATION

CROSS-REFERENCE TO RELATED APPLICATIONS

The present application is a continuation of, and claims priority to, U.S. application Ser. No. 12/769,018, filed on Apr. 28, 2010, which claims priority to European Patent Application EP 09005866.0 filed in the EPO Patent Office on Apr. 28, 2009, the entire contents of which are incorporated herein by reference.

FIELD OF THE INVENTION

The invention is in the field of telecommunications and, particularly, in the field of machine-to-machine communications employing telecommunications networks.

BACKGROUND

The past decades have shown an ever increasing demand for data capacity of telecommunications networks. Telecommunications providers have adapted their networks to provide extended services to meet the demands of their clients.

One example of such services relates to the field of machine-to-machine (M2M) communications. M2M applications typically involve hundreds or thousands of communication modules that only rarely require access to a telecommunications network. An example involves the electronic reading of e.g. electricity meters at the homes of a large customer base from a server. Other examples include sensors, meters, coffee machines, etc. that can be equipped with communication modules that allow for reporting status information to a data processing centre over the telecommunications network. Such devices may also be monitored from a server. The data processing centre may e.g. store the data and/or provide a schedule for maintenance people to repair a machine, meter, sensor, etc.

SUMMARY

Contemporary networks (GPRS and UMTS) and proposals for future networks (Evolved Packet System (EPS)) used for wireless telephony and data services are organized relatively inefficiently for M2M applications. Such applications involve large amounts of terminals, but these terminals are typically characterized by a low mobility, i.e. the terminals are typically stationed at one location or within one cell for a significant period of time.

To that end, a telecommunications network is disclosed that is configured for wirelessly establishing a connection with a terminal located at a location in said network by a server. The terminal is identified by a terminal identifier in the telecommunications network. The telecommunications network contains a first network node and a second network node.

The first network node is configured for receiving a data unit for the terminal from the server, that may be located in or outside the telecommunications network. The data unit comprises the terminal identifier. The first network node is being configured for receiving a location identifier indicative of the location of the terminal from the server and for deriving an address of the second network node using the location identifier. The derived address of the second network node is then used for transmitting a first connection request to the second network node for establishing a connection to the terminal.

The second network node is configured for receiving the first connection request from the first network node and for transmitting a second connection request for establishing the connection towards the terminal.

Furthermore, a method for wirelessly establishing a network-initiated connection with a terminal located at a location in a telecommunications network by a server is disclosed. The terminal is identified by a terminal identifier in the telecommunications network. A data unit for the terminal is received from the server at a first network node, wherein the data unit comprises the terminal identifier. Also, a location identifier is received at the first network node from the server that is indicative of the location of the terminal in the telecommunications network. In the first network node, an address of a second network node is derived using the location identifier. A connection request is then transmitted from the first network node to the thus derived second network node.

Still further, a computer program, a first network node, a second network node, and a server are disclosed for use in or with the telecommunications network and/or the method in such a network.

Conventionally, the mobility of mobile terminals requires the use of mobility management procedures and the connection to such terminals requires location updates in and location requests to network nodes of the telecommunications network, typically referred to as a Home Location Register (HLR) and a Visitor Location Register (VLR) as generally known to a skilled person.

Since the mobility of the terminals in the M2M communications system is relatively low, the location of the terminals is generally known at a server that is typically used for transmitting or receiving data to and from the terminals, respectively. This fact is advantageously used by feeding a location identifier of the terminal to a network node that receives a data unit for this terminal. This location identifier obviates the need for requesting a location of a terminal and/or the address of another service node from a HLR, thereby reducing signal flow and reducing location storage and updates in the telecommunications network.

Furthermore, the terminal (or the SIM card thereof, if any) cannot be reached outside the area indicated by the location identifier, thereby making theft of the often unattended terminal or SIM card less attractive.

It should be noted that the location identifier may indeed comprise geographical information, cell information where the terminal is located in the RAN, and/or location area or routing area information. An address of the second network node may not be known at the server, and should in such a case be derived at the first network node from the location identifier.

The location identifier can be received from the server in the data unit, thereby obviating the need for a location identifier interface between the server and the first network node.

The location identifier may be pre-stored at the first network node, i.e., the location identifier is stored at the first network node before a first data unit is received from the server. The location identifier may, i.e., have been obtained at the first network node during a previous connection and been stored. The location identifier, however, may also be obtained in the first network node from the server separately from the data unit. Such an embodiment provides the advantage of an unmodified data unit and allows for changing location parameters of the terminal independently from the transmission of data units to the terminal.

Some embodiments are advantageous in that further location information is contained in, represented by or derivable from the location identifier. The further location information may comprise a Location Area (LA), a routing area (RA) and/or a cell identifier. The further location information is decisive for the part (e.g. one or more cells) of the telecommunications network wherein the connection request is transmitted upon initiation by the second network node. As the further location information is received at the second network node, there is no need for the second network node to obtain this further location information from elsewhere.

Some embodiments are directed to the situation wherein the terminals provide the further location information to the second network node. In these embodiments, the address of the second service node is obtained using the location identifier received from the server, whereas the more detailed information is available at or retrievable by the second network node.

Hereinafter, embodiments of the invention will be described in further detail. It should be appreciated, however, that these embodiments may not be construed as limiting the scope of protection for the present invention.

DETAILED DESCRIPTION

Figure 1:
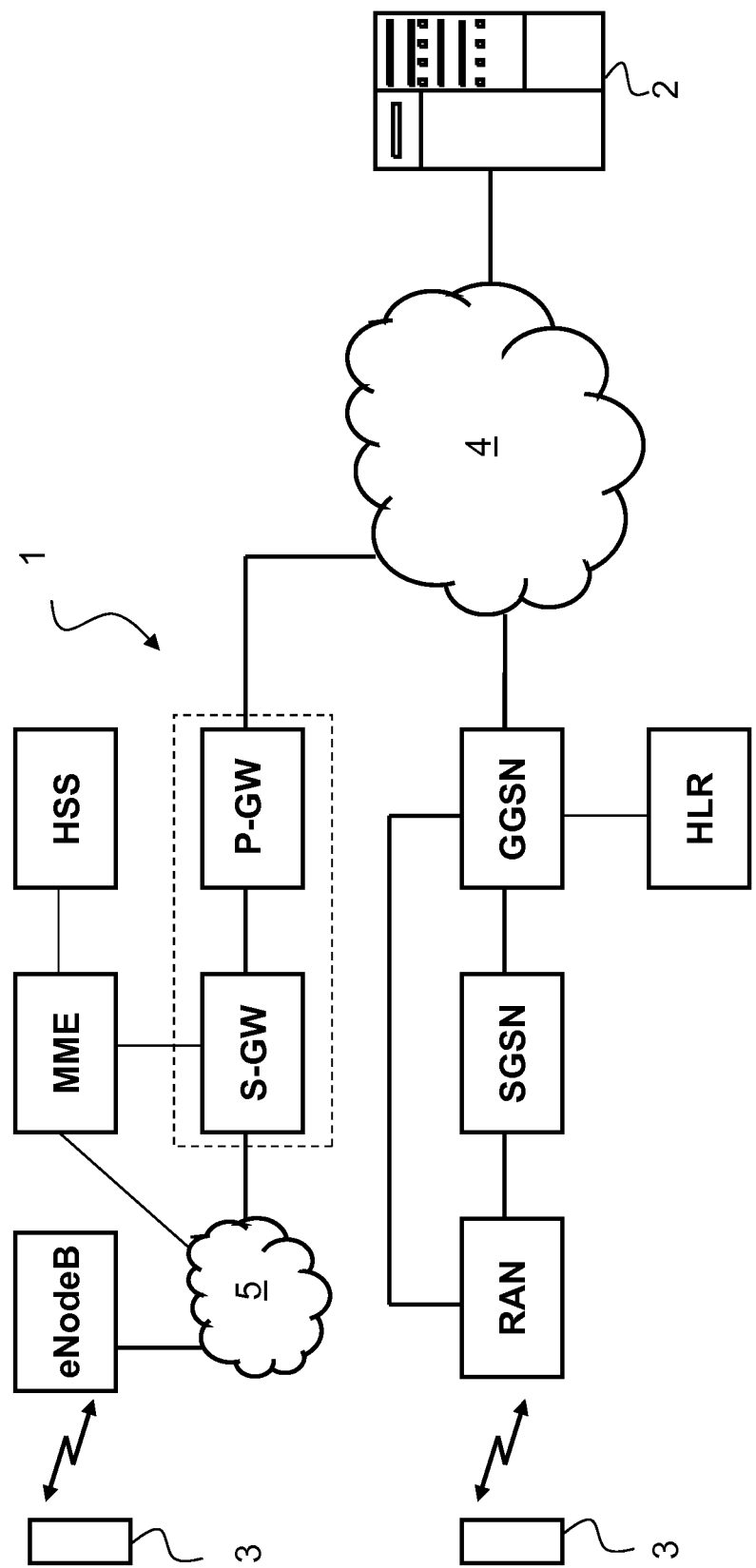
FIG. 1 is a schematic illustration of a telecommunications network according to an embodiment of the invention.

FIG. 1 shows a schematic illustration of a telecommunications network 1 according to an embodiment of the invention. The telecommunications network 1 allows communication between a server 2 and a terminal 3 over a packet data network 4, wherein access of the terminal to the telecommunications network 1 is wireless.

In the telecommunications network of FIG. 1, three generations of telecommunications networks are depicted together for purposes of brevity.

The lower branch represents a GPRS or UMTS telecommunications network comprising a GPRS Gateway Support Node (GGSN), a Serving GPRS Support Node (SGSN) and a Radio Access Network (RAN or UTRAN). For a GSM/EDGE radio access network (GERAN), the RAN comprises a Base Station Controller (BSC) connected to a plurality of Base Station Transceivers (BTSs), both not shown. For a UMTS radio access network (UTRAN), the RAN comprises a Radio Network Controller (RNC) connected to a plurality of NodeB's, also not shown. The GGSN is conventionally connected to a Home Location Register (HLR).

Further information of the general architecture of a mobile network can be found in 3GPP TS 23.002 and for the GPRS core network in 3GPP TS 23.060.

The upper branch in FIG. 1 represents a next generation telecommunications network, commonly indicated as Long Term Evolution (LTE) or Evolved Packet System (EPS). Such a network comprises a Gateway GW containing a P-GW and a S-GW for an operator. The e-UTRAN of EPS comprises enhanced NodeB's (eNodeB's) providing wireless access for a terminal 3 that are connected to the GW via a packet network 5. The S-GW is connected to a Home Subscriber Server HSS and a Mobility Management Entity MME for signalling purposes.

Further information of the general architecture of a EPS network can be found in 3GPP TS 23.401.

Of course, architectures other than defined by 3GGP can also be used within the context of the present invention.

Whereas the invention as defined in the appended claims is generally applicable to such networks, a more detailed description will be provided below for a GPRS/UMTS network.

For such a network, the SGSN typically controls the connection between the telecommunications network 1 and the terminal 3. It should be appreciated that the telecommunications network 1 generally comprises a plurality of SGSNs, wherein each of the SGSNs is connected typically to several BSC's/RNC's to provide a packet service for terminals 3 via several base stations/NodeB's. Each SGSN normally comprises a Visitor Location Register (VLR), not shown in FIG. 1.

The GGSN is connected to the packet data network 4, e.g., the internet, a corporate network, or a network of another operator. On the other side, the GGSN is connected to a plurality of SGSN's.

The GGSN is configured for receiving a data unit for the terminal 3 from the server 2 over the network 4. The data unit contains a terminal identifier, such as an IP address, of the terminal 3. The GGSN normally contains the IMSI of the terminal 3 and selects the IMSI of the terminal 3 on the basis of the IP address received from the server 2.

Conventionally, terminal 3 is non-stationary, and the network 1 has to find out the present location of the terminal 3. Finding the present location of the terminal 3 generally involves a plurality of steps, as known to the person skilled in the art, including a request to the HLR for the presently responsible SGSN for the Location Area or Routing Area in the RAN/UTRAN where the terminal 3 is presently located, and paging. Such procedures are described in 3GPP TS 23.060 and 3GPP 29.060. The paging for establishing the connection is described in, e.g., 3GPP 25.413.

The present disclosure is based on the insight that for M2M applications, the location of a terminal 3 may still not be known in the telecommunications network 1 but will generally be known to the server 2 for the organisation operating the server 2 will generally deploy the terminals 3 in the field or at least have instructed where in the telecommunications network 1 the terminals 3 should be deployed.

This insight can be used to advantage by informing the telecommunications network 1 of (an indication of) the location of the terminal(s) 3 from the server 2, such that a network-initiated connection to the terminal 3 may be performed without requiring access to a HLR. This saves considerable resources in the network, including storage capacity in the HLR (no need to store or update terminal locations) as well as bandwidth (no need for requests to and responses from the HLR).

(Indications of) locations may include the SGSN via which the terminal 3 can be connected, cell identifiers of the RAN/UTRAN, Location Areas, Routing Areas, geographical coordinates, and/or postal address.

Various alternatives have been envisaged for informing the telecommunications network 1, particularly the GGSN thereof, of the (indication of the) location of a terminal 3 from the server 2.

In a first alternative, a location identifier indicative of the location of the terminal 3 in the telecommunications network 1 is contained in the (first) data unit that is received by the GGSN.

In a second alternative, the location identifier may be pre-stored in the GGSN before a first data unit is received from the server 2. The location identifier may e.g. have been obtained at the GGSN during a previous connection and been stored after terminating the connection.

The location identifier, however, may also be obtained by the GGSN from the server 2 separately from the data unit. This alternative provides the advantage of an unmodified data unit and allows for changing location parameters of the terminal 3 independently from the transmission of data units to the terminal 3.

As mentioned above, the location identifier as provided by the server 2 may contain an identifier of the SGSN via which a connection to the terminal 3 can be established. Of course, in order to eventually contact the terminal 3, further location information of the terminal 3 in the telecommunications network 3, particularly the RAN/UTRAN thereof, is required. Such further information may comprise one or more cell identifiers of cells of the RAN/UTRAN wherein the terminal 3 is located, a location area or a routing area.

Various alternatives have been envisaged to obtain the further location information in the telecommunications network, particularly the SGSN thereof.

Firstly, the further location information may already have been included in the location identifier of the data unit received at the GGSN and been forwarded to the SGSN. It should be appreciated that the relevant SGSN may be derived from the location identifier as received by the GGSN. The further location information may also have been pre-stored at the GGSN and been transferred to the SGSN at the receipt of a data unit at the GGSN. When the SGSN receives the further location information, the SGSN may directly initiate paging, i.e. a connection request, for the terminal 3 in the part of the RAN identified by the further location information.

Secondly, the further location information may be received from the terminal 3 itself. The further location information is than stored at or retrievable by the SGSN upon receipt of a connection request from the GGSN. Again, when the SGSN is triggered in this manner, the SGSN may initiate paging, i.e. a connection request, for the terminal 3 in the part of the RAN identified by the further location information.

It should be noted that data may either be transferred via the SGSN or by-passing the SGSN and be transferred directly to the RNC. Signalling always involves the SGSN for GPRS networks. The RNC may replace the function of the SGSN in the above paragraphs in case data bypasses the SGSN.

In case of an EPS network, the function of the GGSN is performed by the GW, and the eNodeB or another S-GW (in case another operator is involved, e.g. when roaming) constitutes a second network node.

It should be appreciated that, while the present disclosure relates to packet-switched communications, the invention equally applies to circuit-switched communications. This requires a modification of the procedure described in 3GPP TS 23.018 along the lines described below for packet-switched communications.

Figure 2:
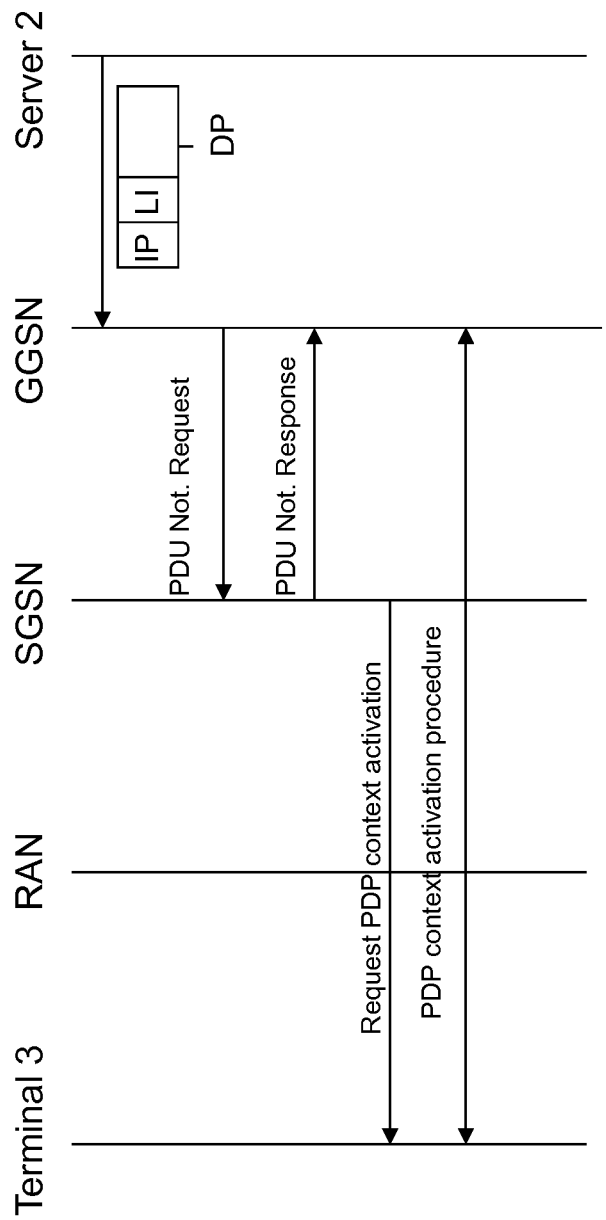
FIG. 2 is a first time diagram schematically illustration an operating example of the telecommunications network of FIG. 1.
Figure 3:
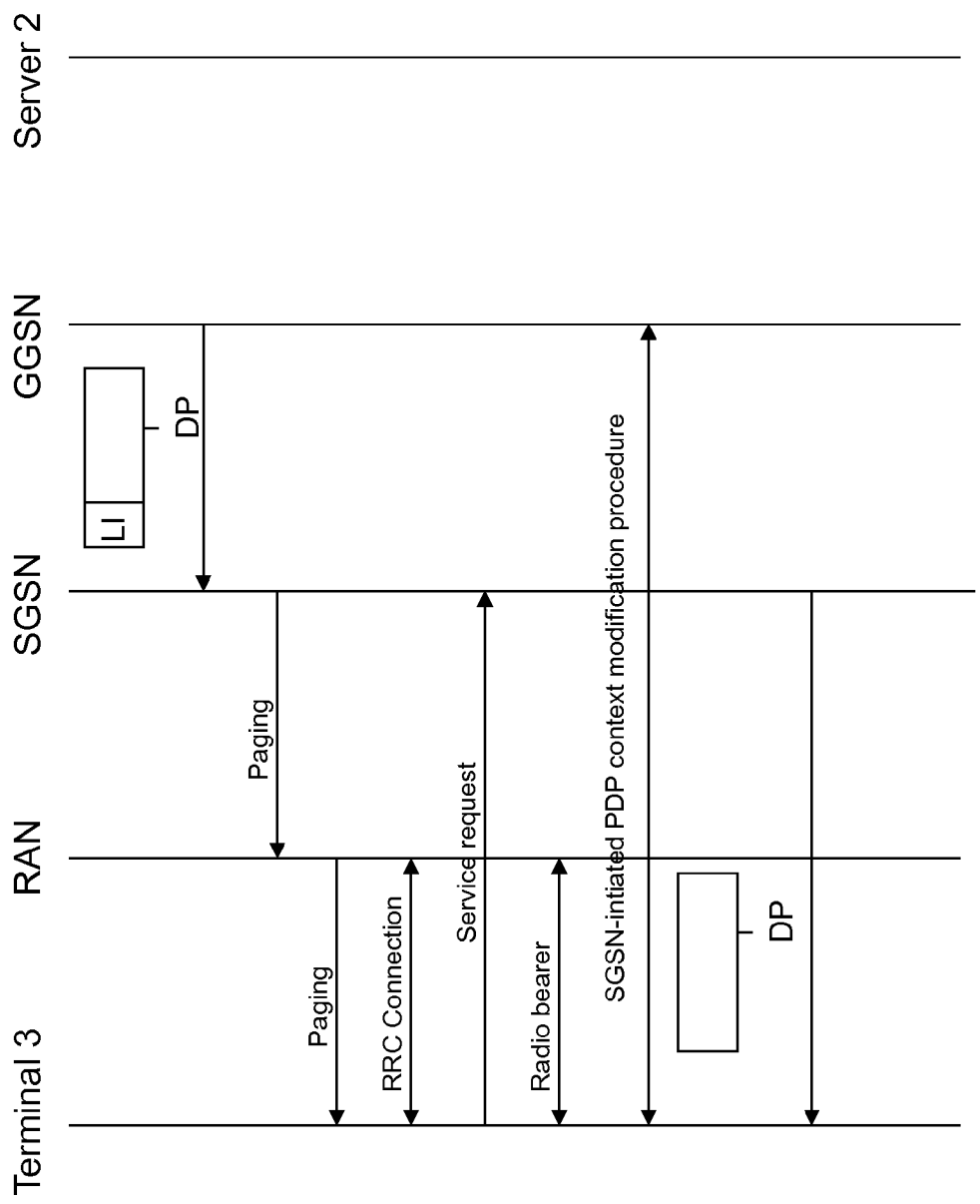
FIG. 3 is a second time diagram schematically illustration an operating example of the telecommunications network of FIG. 1.

FIGS. 2 and 3 are time diagrams for a GPRS telecommunications network 1 schematically illustrating an example of signal flow between the various components of the telecommunications network 1, the server 2 and the terminal 3. FIG. 2 illustrates a network-requested PDP context activation procedure, which is initiated when a data packet DP arrives at the GGSN. The data packet includes a terminal identifier, e.g. an IP address, and a location identifier, LI. The GGSN has information, the IMSI, which relates to a particular IP address.

Conventionally, the IMSI is used to for requesting routing information from the HLR. The HLR returns the address of the SGSN via which the terminal can be connected.

As the data packet DP from the server 2 includes a location identifier, this step can be omitted.

When receiving the data packet DP, the GGSN determines if the network-requested PDP context activation procedure has to be initiated. The GGSN stores subsequent data packets received for the same address.

The GGSN derives the address of the relevant SGSN from the location identifier in the data packet DP and sends a PDU notification request message to the thus derived SGSN, the request containing the IMSI, PDP type, PDP Address, and APN. The request may also contain a further information element containing further location information, e.g., a cell identifier, a routing area, a location area, etc., that can be used by the SGSN for initiating the paging procedure described below with reference to FIG. 3.

The SGSN returns a PDU notification response message to the GGSN in order to acknowledge that it shall request the terminal 3 to activate the PDP context indicated with the PDP Address.

In a next step, the SGSN sends a request PDP context activation message via the RAN to the terminal 3 and the PDP context is activated.

Now the PDP context has been activated, the data packet DP can be transferred to the SGSN.

The next steps perform a network initiated service request procedure from the SGSN to the terminal 3. Various alternatives exist, but generally, the SGSN initiates a paging message in the identified part of the RAN. As described above, the further information for transmitting this paging message from a part of the RAN may be obtained at the SGSN in various ways.

FIG. 3 is a timing diagram illustrating a network initiated service request procedure for a GPRS telecommunications network 1.

In a first step, the data packet DP, contained in a further packet, is received at the SGSN.

The SGSN sends a paging message to the RNC of the RAN. The RNC pages the terminal 3 by sending a paging message to the terminal 3 that requests an RRC connection to the RNC. The RRC connection is set up and a service request is subsequently transmitted from the terminal 3 to the SGSN. The SGSN may then perform security procedures, if necessary.

Finally, a radio bearer is established and a SGSN-Initiated PDP context modification procedure is performed to deliver the data packet DP at the terminal 3.

The invention claimed is:

1. A server configured for connecting with a terminal via a telecommunications network, the server comprising:
   a location identifier indicative of a location of the terminal in the telecommunications network, wherein the server is located outside of the telecommunications network, and the location of the terminal is known to the server (i) without the server requesting the terminal's location from the telecommunications network, and (ii) prior to the server initiating communications with the terminal via the telecommunications network,
   wherein the telecommunications network includes network nodes, and the terminal is identified by a terminal identifier and accessible at the location in the telecommunications network,
   wherein the server is further configured to transmit the location identifier to a node in the telecommunications network, wherein the server is further configured to transmit a data unit comprising the terminal identifier,
and wherein server is further configured to transmit the location identifier and the terminal identifier either (i) together in the data unit or (ii) in separate transmissions.

2. The server according to claim 1, wherein the location identifier as provided by the server contains an identifier of a network node via which a connection to the terminal is established.

3. The server according to claim 1, wherein the terminal identifier is an Internet Protocol address.

4. The server according to claim 1, wherein the location identifier comprises separate further location information separate from the location information for further identifying the location of the terminal in the telecommunications network.

5. The server according to claim 1, wherein the further location information is transmitted to a first network node separately from the data unit.

6. A method of initiating a packet data protocol (PDP) context activation procedure for a terminal accessible at a location in a telecommunications network, the method comprising:
a server located outside of the telecommunications network transmitting a data unit to a node in the telecommunications network, wherein the server comprises a terminal identifier to identify the terminal and further comprises a location identifier indicative of the location of the terminal in the telecommunications network,
wherein the location of the terminal is known to the server (i) without the server requesting the terminal's location from the telecommunications network, and (ii) prior to transmitting the data unit to the telecommunications unit,
and wherein the data unit comprises the terminal identifier and the location identifier.

\* \* \* \* \*

UNITED STATES PATENT AND TRADEMARK OFFICE
CERTIFICATE OF CORRECTION

| | |
|---|---|
| PATENT NO. | : 9,137,625 B2 |
| APPLICATION NO. | : 14/055998 |
| DATED | : September 15, 2015 |
| INVENTOR(S) | : Antonius Hendrikus Johannes Norp, Annemieke Josefa Rene Kips and Michael Robert Schenk |

Page 1 of 1

It is certified that error appears in the above-identified patent and that said Letters Patent is hereby corrected as shown below:

Title Page:

Item [72] Inventors: please delete "Annemieke Kips Josefa Rene Kips" and insert -- Annemieke Josefa Rene Kips --

Signed and Sealed this
Twenty-second Day of March, 2016

Michelle K. Lee
*Director of the United States Patent and Trademark Office*